Jan. 30, 1940.   LE ROY T. PEARSON ET AL   2,188,308

CONNECTING MECHANISM

Filed May 9, 1938

INVENTORS
Le Roy T. Pearson
BY Frank M. Zimmerman
Roy A. Plant
ATTORNEY

Patented Jan. 30, 1940

2,188,308

UNITED STATES PATENT OFFICE 2,188,308

CONNECTING MECHANISM

Le Roy T. Pearson and Frank M. Zimmerman, Battle Creek, Mich.

Application May 9, 1938, Serial No. 206,766

6 Claims. (Cl. 284—17)

The present invention relates broadly to connections for conductors of fluids, and in its specific phases relates to an appliance connector with a valve which is automatically opened and closed by the connection and disconnection of the removable portion of the mechanism.

In the past a few attempts have been made to devise couplings of one type or another for use in conducting fluids such as compressed air, water under pressure, or the like. All of these devices have one or more of the faults of being prone to leak, relatively complex, obstruct the free flow of fluid, depend upon high pressure of the fluid to aid in sealing the connection, use separately operable valves, which permits accidental turning on of the fluid while the coupling is disconnected, or have some other inherent fault.

Accordingly, among the objects of the present invention is the provision of a mechanism adapted to overcome or at least substantially mitigate the faults of such prior art.

Another object of the present invention is the provision of a mechanism containing a valve which shuts off fluid flow therethrough except when the removable portion of the mechanism is in place and at least partially turned to locking position.

Another object is to provide an automatic positively operated lock for holding the parts of the mechanism in prescribed fixed position while in use.

Another object is to provide a mechanism which has an unobstructed passageway therethrough when the parts thereof are locked in place.

Another object is to provide means for increasing the gripping pressure on the sealing gasket as the removable portion of the mechanism is turned to locking position.

Another object is to provide the gasket contacting face of the removable portion of the mechanism with means for further aiding in making a leak-proof connection.
A further object is to provide a mechanism which is fluid tight under use in vacuum systems, as well as with both low and moderately high pressure fluids, and yet which does not rely upon the pressure of the fluid flowing therethrough for sealing against leakage.

A further object is to provide a mechanism wherein disconnection of same automatically stops the flow of fluid therethrough.

A further object is to provide a mechanism permitting plugging in of flexible connections to appliances such as those which use gas.

A still further object is to provide a mechanism which is safe to use in connection with poisonous fluids, such as fuel gas, and which is adapted for use in the installation and relocation of appliances, such as gas stoves, without requiring the presence of a mechanic to disconnect and reconnect same.

Still further objects and advantages will appear as the description proceeds.

To the accomplishment of the foregoing and related ends, the invention, then, consists of the means hereinafter fully described and particularly pointed out in the claims, the annexed drawing and the following description setting forth in detail certain means for carrying out the invention, such disclosed means illustrating, however, but several of various ways in which the principle of the invention may be used.

Figure 1:
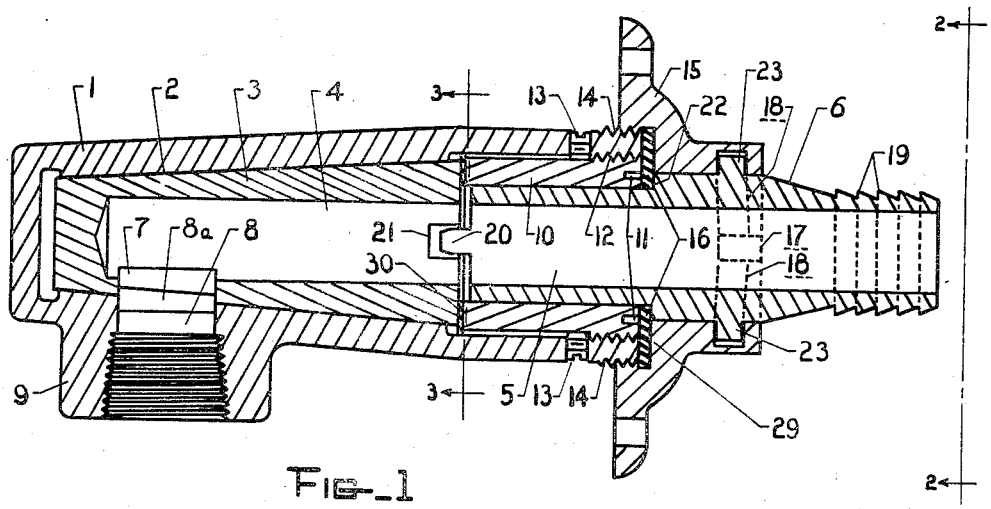
Figure 1 shows a sectional view of one form of the present invention.
Figure 3:
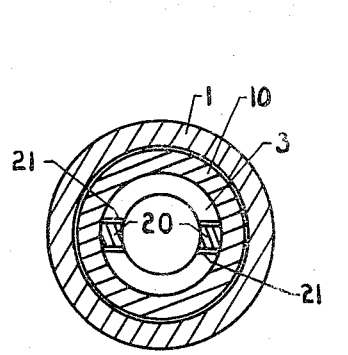
Figure 3 is a sectional view of the mechanism taken along the line 3—3 of Figure 1.

Referring more particularly to the drawing, the body 1 of the mechanism is provided with a tapered bore 2 into which a rotary sleeve valve 3 with corresponding taper is adapted to rotatably fit. The tapered bore 2 and tapered sleeve valve 3 may be in the form of a ground joint where it is desired to have a fit of maximum tightness. Lengthwise of said valve is provided a substantially centrally located tubular passageway 4 which communicates at one end with the tubular passageway 5 through removable connector member 6. Through the side of said valve member 3 adjacent its other end is provided an opening 7 which communicates with passageway 8 in the inlet portion 9 of body 1. The opening 7 may be of various shapes, but for most purposes it is preferable to make it in the form of a relatively narrow substantially rectangular passageway placed lengthwise of the sleeve valve 3. The passageway 8 is preferably formed at its upper end into a substantially rectangular opening 8a which corresponds approximately in shape, size, and location with opening 7 when the sleeve valve 3 is set in open position. The forming of openings 7 and 8a in this manner gives a satisfactory sealing overlap when the valve is given a quarter turn to close same. The body 1 of the mechanism is preferably closed at the small end of its tapered bore 2 and open at the other end to permit the insertion of the rotary sleeve valve 3. The inner circumference of the body 1 at its open end is preferably threaded to receive an externally threaded sleeve 10. This sleeve may be provided with conventional means for screwing same into place where it will hold the rotary sleeve valve 3 tightly in position, and yet permit same to be rotated. To provide for adjustment, reduce friction, and compensate for wear, a washer 30 of appropriate thickness may be used between the adjacent ends of sleeve 10 and valve 3. A suitable means for facilitating the screwing of sleeve 10 in place consists of small recessed openings 11 adapted for engagement by a spanner wrench (not shown). The threads 12 by which sleeve 10 engages body 1 may be made to fit tightly and hence prevent rotation of sleeve 10 except when a wrench is used. If desired, however, screws 13 may be used to lock sleeve 10 in place after it has been screwed in to the desired position.

The outer circumference of body 1 at the open end thereof is preferably provided with threads 14 adapted to engage corresponding internal threads on a suitable connector receiving member which, for instance, may be in the form of a floor or wall plate 15. The wall plate 15 in addition to being bored and threaded for attachment to body 1 by means of threads 14 thereon, is also concentrically bored lengthwise to the outer end thereof at a smaller diameter, yet one which is substantially larger than the inner diameter of sleeve 10. This construction leaves a shoulder 29, joining the two bores of plate 15, which is adapted to press throughout against the face of a suitable gasket 16 when plate 15 is screwed into place on threads 14 of body 1. Gasket 16 is preferably made from compressible material such as rubber and in the form of a disc having an inner diameter approximately the same as the bore of sleeve 10, and an outer diameter permitting it to fit the large bore of the plate 15. The outer end of plate 15 is provided with suitable means for engaging connector 6, and such means in one preferred form consists of notched openings 17 (Figure 2) which extend inward parallel to the bore of plate 15 and connect with spiral slots 18 (Figures 1 and 2).

Figure 5:
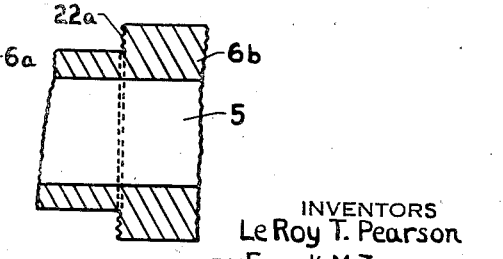
Figure 5 is an enlarged view of a modified form of the gasket gripping shoulder of the removable connector portion of the mechanism.

The connector member 6 is provided at its outer end with a suitable means, such as serrations 19, for use in connecting same to a suitable hose or the like (not shown). The opposite end of connector 6 is provided with clutch projections 20 adapted to engage suitably located slots 21 in the end of rotary sleeve valve 3. The point of each clutch projection 20 is preferably tapered to facilitate the entry thereof into a corresponding slot 21. The connector member 6 is machined so that it will closely and rotatably fit the bore of sleeve 10 and inner diameter of gasket 16, and adjacent to such portion it is machined to a larger diameter adapted to fit the bore of plate 15, the shoulder 22 of connector member 6 being adapted to seal against the side of gasket 16. On the outer face of said portion fitting the bore of plate 15 are placed short thread members adapted to fit a suitable correspondingly spiral threaded portion of the bore of plate 15. One of the many constructions of this nature consists of projections 23 on connector member 6 adapted to pass through notched openings 17 (Figure 2) and engage spiral slots 18 in plate 15. The passage of projections 23 through openings 17 followed by clockwise rotation, as viewed in Figure 2, will cause connector member 6 to move to the left, as viewed in Figure 1, and force shoulder 22 into sealing engagement with gasket 16. The shoulder 22 may be perfectly smooth if desired, but a better seal will be effected where the shoulder is corrugated as is shown at 22a in Figure 5. With either construction a double seal is accomplished where the inner diameter of gasket 16 is substantially the same as the outer diameter of the portion of connector member 6 which fits the inner bore of sleeve 10. Under these conditions a seal is had with shoulder 22 against the side of gasket 16, and at the same time the pressing of shoulder 22 against the gasket 16 forces same to radially grip connector member 6 and effect the second seal against leakage.

In order to prevent connector member 6 from accidentally being rotated and disconnected, a suitable holding means may be used. For instance, as is shown in Figure 2, a spring arm 24 provided with a locking dog 25 adapted to pass through an opening 26 into spiral slot 18 may be utilized. This spring arm 24 may be provided with suitable means for disengaging locking dog 25 from holding projection 23 and thus permit rotation and removal of connector member 6. One convenient way that this may be accomplished is to bend the free end of the spring arm 24 upward to form a hook 28 which may be readily gasped to elevate locking dog 25 out of locking engagement.

Figure 2:
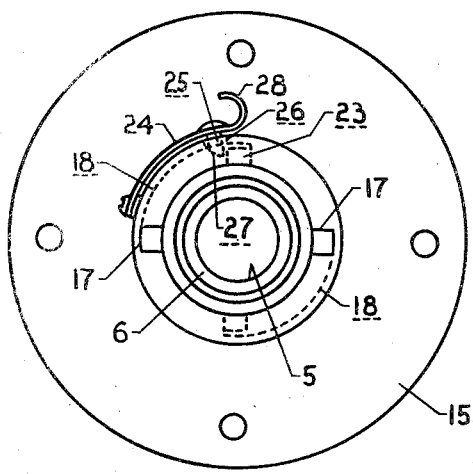
Figure 2 is an end view of the mechanism as vewed from the right side of Figure 1.
Figure 4:
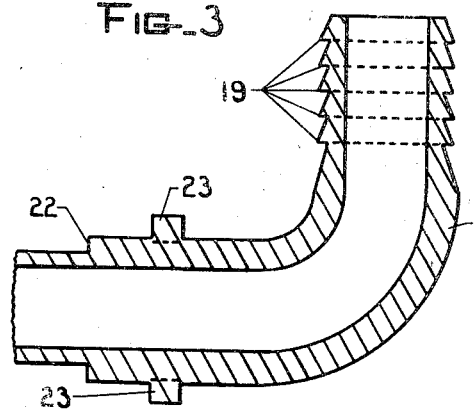
Figure 4 is a sectional view of a modified form of the removable connector portion of the mechanism.

The connector member 6 may be of straight form, as is shown in Figure 1, or of other convenient shape, for instance of the curved form 40 shown in Figure 4. The latter construction is exceptionally convenient for use in connecting a flexible hose or the like where the line of approach of same is in line with the turned end of the connector 6a.

The mechanism is assembled in the following manner: The rotary sleeve valve 3 is first coated with key grease or other suitable lubricant, depending upon the fluid to be handled by the mechanism. The valve is then passed into the bore 2 of body 1 of the mechanism. Space washer 30 is inserted and sleeve 10 is then screwed into place to hold rotary sleeve valve 3 tightly in position and yet permit rotation of same. Where locking screws 13 are used, these are then tightened to prevent sleeve 10 from rotating. Plate 15 with gasket 16 is then screwed into place with notched openings 17 in proper location for the operation of the mechanism. Connector member 6 is then passed endwise through the open end of plate 15 until clutch projections 20 engage slots 21 and projections 23 pass through notched openings 17 to the starting end of spiral slots 18. In this position the rotary sleeve valve 3 has its opening 7 out of alignment with passageway 8 in inlet portion 9 of body 1. The rotation of connector member 6 through the coaction of projections 23 with spiral slots 18 moves connector member 6 inwardly to make a tight fitting seal between its shoulder 22 and gasket 16. At the same time the rotation of connector member 6 through the contact of clutch projections 20 with slots 21 in rotary sleeve valve 3 causes the latter to rotate and bring opening 7 therein into alignment with passageway 8, complete alignment preferably being attained when projections 23 are turned to the end of their travel in spiral slots 18. One of the projections 23 as it approaches the end of spiral slot 18 will contact the sloping face 27 of locking dog 25 and cause same to rise. When projection 23 passes locking dog 25, the spring tension of spring arm 24 will force the locking dog 25 downward to lock connector member 6 against return rotation until locking dog 25 is raised through the agency of handle 28 or the equivalent.

Having the mechanism thus assembled, it is ready for installation at the point of use with inlet portion 9 connected to a suitable piping system or the like, and removable connector 6 fastened to a suitable length flexible hose or the equivalent which supplies fluid to a point of use.

Where the mechanism is to be used in the home or other location for facilitating the delivery of gas to a gas appliance such as a gas plate, gas stove, gas refrigerator, or the like, the fixed part of the mechanism is connected to the gas line while the removable connector member 6 is mounted on a suitable flexible hose connected to the gas appliance. This permits the plugging in of the gas appliance at will in equivalent manner to the connecting of an electric appliance to a source of electricity through the use of a suitable electric cord and wall outlet. The plugging in of connector member 6 and rotation to lock same automatically turns on the gas. To disconnect the gas appliance, the locking dog 25 is released and connector member 6 rotated and removed. This action not only disconnects the appliance, but also results in the automatic rotation of sleeve valve 3 so as to shut off the flow of gas.

Other modes of applying the principle of our invention may be employed instead of those explained, change being made as regards the mechanism herein disclosed, provided the means stated by any of the following claims or the equivalent of such stated means be employed.

We therefore particularly point out and distinctly claim as our invention:

1. In a mechanism of the character described, the combination which comprises a body member having a suitable bore with an inlet and an outlet, a sleeve valve rotatably fitting said bore and having openings adapted to cooperate with said inlet and outlet of the body member, a means for engaging the outlet end of said body member, a gasket between said engaging means and said body member, a tunneled connector member adapted to pass through said means engaging said body member, means on the adjacent ends of said sleeve valve and said connector member which cooperate in manner such that rotative movement of the latter may be used to open and close said valve, and means on said connector member and on said body engaging member for coacting in moving said connector member endwise into sealing engagement with said gasket when said connector member is suitably rotated.

2. In a mechanism of the character described, the combination which comprises a body member having a tapered bore with an inlet adjacent the small end of said bore and an outlet substantially concentric with said bore at the large end thereof, a correspondingly tapered sleeve valve rotatably fitting said bore and having a passageway with openings adapted to cooperate with said inlet and outlet of the body portion, the bore of said body portion being of a size permitting the insertion and removal of the sleeve valve therefrom at the end thereof adjacent the large end of the tapered bore, means for normally holding said sleeve valve substantially fixed against endwise movement but permitting rotation thereof, means for engaging the outlet end of said body member, a disc shape gasket, said gasket being gripped in place between said means for engaging the outlet end of the body member on one side and said body member and means for holding the sleeve valve on the other, a tunneled connector member adapted to pass through said body engaging member and sleeve valve holding member and rotatably fit same, a shoulder on said connector member for contacting a portion of the face of said gasket opposite said sleeve valve holding means, means on the ends of said sleeve valve and said connector member which cooperate in manner such that rotative movement of the latter may be used to open and close said valve, and means on said connector member and on said body engaging member for coacting in moving said connector member endwise and bringing said shoulder on the connecting member into sealing engagement with said gasket when said connector member is inserted in place and suitably rotated.

3. In a connecting mechanism for conductors of fluids, the combination which comprises a body member having a tapered bore portion with an outlet at one end and an inlet adjacent the other end, a correspondingly tapered sleeve valve rotatably fitting said bore and having a passageway with openings adapted to cooperate with said outlet and inlet of the body portion, a sleeve threadedly engaging the inner bore of the open end of said body member and adapted to hold said sleeve valve against endwise movement and yet permit same to be rotated, a flanged member threadedly engaging the open end of said body member, said flanged member being bored concentrically with said sleeve but at a substantially larger diameter, a disc shape gasket having an inner opening substantially the same size as the bore of said sleeve, and an outer diameter approximately the same as the threaded diameter of said flanged member, said gasket being gripped in place between said flanged member on one side and said body member and sleeve on the other, a tunneled removable connector member adapted to pass through said flanged member and said sleeve, clutch projections on the end of said connector member adapted to engage suitable slots in the end of said sleeve valve for rotating same, said connector member being of a diameter at its inner end adapted to fit in the bore of said sleeve, and adjacent thereto being of a larger diameter adapted to fit the bore of said flanged member, a shoulder at the junction of the two diameters of said connector member and means on said flanged member for coacting in moving said connector member endwise and bringing said shoulder into sealing engagement with said gasket when said connector member is suitably rotated.

4. In a mechanism of the character described, the combination which comprises a body member having a suitable bore with an inlet and an outlet, a sleeve valve rotatably fitting said bore and having openings adapted to cooperate with said inlet and outlet of the body member, means for holding said sleeve valve against endwise movement but permitting rotation thereof, a means for engaging the outlet end of said body member, a gasket between said outlet engaging means on one side and the body member and sleeve valve holding means on the other side, a tunneled connector member adapted to pass through said sleeve valve holding means and said means engaging the body member, clutch projections on the end of said connector member adapted to engage suitable slots in the end of said sleeve valve for rotating same, a shoulder on said connector member, means on said connector member and on said body engaging member for coacting in moving said connector member endwise and bringing said shoulder into sealing engagement with said gasket when said connector member is suitably rotated, and means for locking said connector in sealing engagement with said gasket.

5. In a mechanism of the character described, the combination which comprises a body member having a suitable bore with inlet and outlet, a sleeve valve rotatably fitting said bore and having openings adapted to cooperate with said inlet and outlet openings of the body member, means within said body member and adjacent the outlet end thereof for holding said sleeve valve against endwise movement, a means for engaging the outlet end of said body member, a gasket between said outlet engaging means on one side and the body member and sleeve valve locking means on the other side, a tunneled removable connector member adapted to pass through said means engaging said body member and said sleeve valve locking means, means on the end of said connector member adapted to engage a suitable means on the end of said sleeve valve for rotating same, a shoulder on said connector member, and means on said connector member and on said body engaging member for coacting in moving said connector member endwise and bringing said shoulder into sealing engagement with said gasket when said connector member is suitably rotated, the opposite side of said gasket from the point of engagement with the shoulder of said connector member being supported by the end of said sleeve valve locking means, and all of the parts so assembled that they are removable from the outlet end of said body member.

6. A connecting mechanism for conductors of fluids, which consists of a body member having a tapered bore portion with only two openings, said openings being in the form of an outlet at one end of the body member and an inlet adjacent the other end thereof, a correspondingly tapered sleeve valve rotatably fitting said bore and having a passageway with openings adapted to cooperate with said outlet and inlet of the body portion, a sleeve threadedly engaging the inner bore of the open end of said body member and adapted to hold said sleeve valve against endwise movement and yet permit same to be rotated, a member threadedly engaging the outside of the outlet end of said body member, said body engaging member being bored concentrically with said sleeve but at a substantially larger diameter, a disc shape gasket having an inner opening substantially the same size as the bore of said sleeve, and an outer diameter approximately the same as the threaded diameter of said body engaging member, said gasket being gripped in place between said body engaging member on one side and said body member and sleeve on the other, a tunneled removable connector member adapted to pass through said body engaging member and said sleeve, means on the end of said connector member adapted to engage suitable means on the end of said sleeve valve for rotating same, said connector member being of a diameter at its inner end adapted to fit in the bore of said sleeve which holds the sleeve valve against endwise movement, and adjacent thereto being of a larger diameter adapted to fit the bore of said body engaging member, a shoulder at the junction of the two diameters of said connector member, said shoulder having a corrugated face for sealing engagement with said gasket, and means on said connector member and on said body engaging member for coacting in moving said connector member endwise and bringing said shoulder into sealing engagement with said gasket when said connector member is suitably rotated, and means for releasably locking said connector member after same has been rotated to final sealing engagement position, said sleeve valve, means for holding the sleeve valve against endwise movement, and allied parts all being releasable and removable from the outlet end of said body member.

LE ROY T. PEARSON.
FRANK M. ZIMMERMAN.

CERTIFICATE OF CORRECTION.

Patent No. 2,188,308. January 30, 1940.

LE ROY T. PEARSON, ET AL.

It is hereby certified that error appears in the printed specification of the above numbered patent requiring correction as follows: Page 1, second column, line 25, for "vewed" read viewed; page 3, second column, line 59, claim 3, after "member" insert a comma; line 60, same claim, after "said" insert connector member and on said; and that the said Letters Patent should be read with this correction therein that the same may conform to the record of the case in the Patent Office.

Signed and sealed this 19th day of March, A. D. 1940.

(Seal)

Henry Van Arsdale,
Acting Commissioner of Patents.